United States Patent
Jang

(10) Patent No.: US 11,658,290 B2
(45) Date of Patent: May 23, 2023

(54) LITHIUM METAL SECONDARY BATTERY CONTAINING A CONDUCTING POLYMER NETWORK-BASED ANODE-PROTECTING LAYER

(71) Applicant: Nanotek Instruments, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 257 days.

(21) Appl. No.: 16/404,109

(22) Filed: May 6, 2019

(65) Prior Publication Data

US 2020/0358090 A1 Nov. 12, 2020

(51) Int. Cl.

| | |
|---|---|
| *H01M 10/052* | (2010.01) |
| *H01M 4/36* | (2006.01) |
| *H01M 4/38* | (2006.01) |
| *H01M 10/0585* | (2010.01) |
| *H01M 4/62* | (2006.01) |
| *H01M 4/02* | (2006.01) |

(52) U.S. Cl.
CPC ............ *H01M 4/366* (2013.01); *H01M 4/382* (2013.01); *H01M 4/628* (2013.01); *H01M 10/052* (2013.01); *H01M 10/0585* (2013.01); *H01M 2004/021* (2013.01); *H01M 2004/027* (2013.01)

(58) Field of Classification Search
CPC ..... H01M 4/366; H01M 4/382; H01M 10/052
See application file for complete search history.

(56) References Cited

U.S. PATENT DOCUMENTS

| | | |
|---|---|---|
| 2,798,878 A | 7/1957 | Hummers |
| 10,122,044 B2 | 11/2018 | Tan et al. |
| 2005/0136330 A1 | 6/2005 | Mao et al. |
| 2008/0050658 A1* | 2/2008 | Abe ................. H01M 10/4235 429/338 |
| 2011/0165466 A1 | 7/2011 | Zhamu et al. |
| 2012/0064409 A1 | 3/2012 | Zhamu et al. |
| 2013/0040197 A1 | 2/2013 | Liu et al. |

(Continued)

OTHER PUBLICATIONS

Gurunathan et al., "Synthesis of Hierarchically Porous SnO2 Microspheres and Performance Evaluation as Li-Ion Battery Anode by Using Different Binders" ACS Appl. Mater. Inter. (2014) vol. 6, No. 19, pp. 16556-16564.

(Continued)

*Primary Examiner* — Olatunji A Godo

(57) ABSTRACT

Provided is a lithium metal secondary battery comprising a cathode, an anode, an electrolyte-separator assembly disposed between the cathode and the anode, wherein the anode comprises: (a) an anode active material layer containing a layer of lithium or lithium alloy optionally supported by an anode current collector; and (b) an anode-protecting layer in physical contact with the anode active material layer and in ionic contact with the electrolyte-separator assembly, having a thickness from 10 nm to 500 µm and comprising an electrically and ionically conducting network of cross-linked conjugated polymer chains having a lithium ion conductivity from $10^{-8}$ to $5\times10^{-2}$ S/cm and an electron conductivity from $10^{-8}$ to $10^{3}$ S/cm.

28 Claims, 6 Drawing Sheets

(56) References Cited

U.S. PATENT DOCUMENTS

| | | | |
|---|---|---|---|
| 2013/0224632 A1* | 8/2013 | Roumi | H01M 4/131 |
| | | | 429/516 |
| 2014/0242458 A1 | 8/2014 | Abe et al. | |
| 2014/0255794 A1 | 9/2014 | Zhang et al. | |
| 2015/0221935 A1 | 8/2015 | Zhou et al. | |
| 2016/0351909 A1 | 12/2016 | Bittner et al. | |
| 2017/0062869 A1* | 3/2017 | Zhamu | H01M 4/587 |
| 2017/0179468 A1 | 6/2017 | Fanous et al. | |
| 2017/0194648 A1 | 7/2017 | Bucur et al. | |
| 2017/0194663 A1* | 7/2017 | Zhamu | H01M 4/58 |
| 2018/0051137 A1 | 2/2018 | Kim et al. | |
| 2018/0166759 A1* | 6/2018 | Zhamu | H01M 10/056 |
| 2018/0301707 A1* | 10/2018 | Pan | H01M 4/628 |

OTHER PUBLICATIONS

U.S. Appl. No. 16/380,341 Nonfinal Office Action dated Apr. 2, 2021, 10 pages.

U.S. Appl. No. 16/404,111 Nonfinal Office Action dated Dec. 9, 2020, 6 pages.

U.S. Appl. No. 16/407,731 Nonfinal Office Action dated Apr. 19, 2021, 21 pages.

\* cited by examiner

LITHIUM METAL SECONDARY BATTERY CONTAINING A CONDUCTING POLYMER NETWORK-BASED ANODE-PROTECTING LAYER

FIELD

The present disclosure relates to the field of rechargeable lithium metal batteries having lithium metal as an anode active material, a method of manufacturing same, and a method of improving the cycle stability of all rechargeable lithium metal batteries.

BACKGROUND

Lithium-ion and lithium (Li) metal cells (including lithium metal secondary cell, lithium-sulfur cell, lithium-selenium cell, Li-air cell, etc.) are considered promising power sources for electric vehicle (EV), hybrid electric vehicle (HEV), and portable electronic devices, such as lap-top computers and mobile phones. Lithium metal has the highest capacity (3,861 mAh/g) compared to any other metal or metal-intercalated compound (except $Li_{4.4}Si$) as an anode active material. Hence, in general, rechargeable Li metal batteries have a significantly higher energy density than lithium ion batteries.

Historically, rechargeable lithium metal batteries were produced using non-lithiated compounds having high specific capacities, such as $TiS_2$, $MoS_2$, $MnO_2$, $CoO_2$ and $V_2O_5$, as the cathode active materials, which were coupled with a lithium metal anode. When the battery was discharged, lithium ions were dissolved from the lithium metal anode and transferred to the cathode through the electrolyte and, thus, the cathode became lithiated. Unfortunately, upon cycling, the lithium metal resulted in the formation of dendrites that ultimately caused unsafe conditions in the battery. As a result, the production of these types of secondary batteries was stopped in the early 1990's giving ways to lithium-ion batteries.

Even now, cycling stability and safety concerns remain the primary factors preventing the further commercialization of Li metal batteries for EV, HEV, and microelectronic device applications. These issues are primarily due to the high tendency for Li to form dendrite structures during repeated charge-discharge cycles or an overcharge, leading to internal electrical shorting and thermal runaway. Many attempts have been made to address the dendrite-related issues, as briefly summarized below:

Fauteux, et al. [D. Fauteux, et al., "Secondary Electrolytic Cell and Electrolytic Process," U.S. Pat. No. 5,434,021, Jul. 18, 1995] applied to a metal anode a protective surface layer (e.g., a mixture of polynuclear aromatic and polyethylene oxide) that enables transfer of metal ions from the metal anode to the electrolyte and back. The surface layer is also electronically conductive so that the ions will be uniformly attracted back onto the metal anode during electrodeposition (i.e. during battery recharge). Alamgir, et al. [M. Alamgir, et al. "Solid polymer electrolyte batteries containing metallocenes," U.S. Pat. No. 5,536,599, Jul. 16, 1996] used ferrocenes to prevent chemical overcharge and dendrite formation in a solid polymer electrolyte-based rechargeable battery.

Skotheim [T. A. Skotheim, "Stabilized Anode for Lithium-Polymer Battery," U.S. Pat. No. 5,648,187 (Jul. 15, 1997); U.S. Pat. No. 5,961,672 (Oct. 5, 1999)] provided a Li metal anode that was stabilized against the dendrite formation by the use of a vacuum-evaporated thin film of a Li ion-conducting polymer interposed between the Li metal anode and the electrolyte. Skotheim, et al. [T. A. Skotheim, et al. "Lithium Anodes for Electrochemical Cells," U.S. Pat. No. 6,733,924 (May 11, 2004); U.S. Pat. No. 6,797,428 (Sep. 28, 2004); U.S. Pat. No. 6,936,381 (Aug. 30, 2005); and U.S. Pat. No. 7,247,408 (Jul. 24, 2007)] further proposed a multilayer anode structure consisting of a Li metal-based first layer, a second layer of a temporary protective metal (e.g., Cu, Mg, and Al), and a third layer that is composed of at least one layer (typically 2 or more layers) of a single ion-conducting glass, such as lithium silicate and lithium phosphate, or polymer. It is clear that such an anode structure, consisting of at least 3 or 4 layers, is too complex and too costly to make and use.

Protective coatings for Li anodes, such as glassy surface layers of $LiI$—$Li_3PO_4$—$P_2S_5$, may be obtained from plasma assisted deposition [S. J. Visco, et al., "Protective Coatings for Negative Electrodes," U.S. Pat. No. 6,025,094 (Feb. 15, 2000)]. Complex, multi-layer protective coatings were also proposed by Visco, et al. [S. J. Visco, et al., "Protected Active Metal Electrode and Battery Cell Structures with Non-aqueous Interlayer Architecture," U.S. Pat. No. 7,282,295 (Oct. 16, 2007); U.S. Pat. No. 7,282,296 (Oct. 16, 2007); and U.S. Pat. No. 7,282,302 (Oct. 16, 2007)].

Despite these earlier efforts, no rechargeable Li metal batteries have yet succeeded in the market place. This is likely due to the notion that these prior art approaches still have major deficiencies. For instance, in several cases, the anode or electrolyte structures are too complex. In others, the materials are too costly or the processes for making these materials are too laborious or difficult. Solid electrolytes typically have a low lithium ion conductivity, are difficult to produce and difficult to implement into a battery.

Furthermore, solid electrolyte, as the sole electrolyte in a cell or as an anode-protecting layer (interposed between the lithium film and the liquid electrolyte) does not have and cannot maintain a good contact with the lithium metal. This effectively reduces the effectiveness of the electrolyte to support dissolution of lithium ions (during battery discharge), transport lithium ions, and allowing the lithium ions to re-deposit back onto the lithium anode (during battery recharge).

Another major issue associated with the lithium metal anode is the continuing reactions between electrolyte and lithium metal, leading to repeated formation of "dead lithium-containing species" that cannot be re-deposited back to the anode and become isolated from the anode. These reactions continue to irreversibly consume electrolyte and lithium metal, resulting in rapid capacity decay. In order to compensate for this continuing loss of lithium metal, an excessive amount of lithium metal (3-5 times higher amount than what would be required) is typically implemented at the anode when the battery is made. This adds not only costs but also a significant weight and volume to a battery, reducing the energy density of the battery cell. This important issue has been largely ignored and there has been no plausible solution to this problem in battery industry.

Clearly, an urgent need exists for a simpler, more cost-effective, and easier-to-implement approach to preventing Li metal dendrite-induced internal short circuit and thermal runaway problems in Li metal batteries, and to reducing or eliminating the detrimental reactions between lithium metal and the electrolyte.

Hence, an object of the present disclosure was to provide an effective way to overcome the lithium metal dendrite and reaction problems in all types of Li metal batteries having a lithium metal anode. A specific object of the present disclosure was to provide a lithium metal cell that exhibits a high specific capacity, high specific energy, high degree of safety, and a long and stable cycle life.

SUMMARY

The disclosure provides a lithium metal secondary battery, comprising a cathode, an anode, an electrolyte-separator assembly disposed between the cathode and the anode, wherein the anode comprises: (a) an anode active material layer containing a layer of lithium or lithium alloy (having greater than 70% by weight of lithium metal in said lithium alloy), in a form of a foil, coating, or multiple particles aggregated together, as an anode active material, wherein the anode active material layer is optionally supported by an anode current collector; and (b) an anode-protecting layer in physical contact with the anode active material layer and in ionic contact with the electrolyte-separator assembly, having a thickness from 10 nm to 500 μm and comprising an electrically and ionically conducting network of cross-linked polymer chains having a lithium ion conductivity from $10^{-8}$ to $5 \times 10^{-2}$ S/cm and an electron conductivity from $10^{-8}$ to $10^3$ S/cm.

The invented lithium metal secondary battery may be any battery that makes use of lithium metal or lithium metal alloy as the primary anode active material; e.g. a rechargeable lithium metal cell, a lithium-sulfur cell, a lithium-selenium cell, a lithium-sulfur/selenium cell (where the cathode active material contains both S and Se), or lithium-air (or lithium-oxygen cell) having oxygen as the cathode active material.

It may be noted that a lithium metal battery or lithium-ion battery can have its lithium ion source initially located in the anode or the cathode when the battery cell is made. In a typical lithium-ion battery, the lithium ion source is stored in the cathode (e.g. Li element in the $LiCoO_2$ or $LiMn_2O_4$ formula). During the first charge process (e.g. during the first electrochemical formation process after the cell is made), some of the Li ions come out of the cathode active material and move to the anode side. The cathode active material, by losing x amount, becomes $Li_{(1-x)}CoO_2$ or $Li_{(1-x)}Mn_2O_4$, where $0 < x \leq 1$.

In a typical lithium metal battery, lithium source is located in the anode side in the form of a Li foil, Li coating, Li particles etc. During the first discharge procedure, lithium ions are ionized and released from this lithium source and move to the cathode side. During a subsequent recharge procedure, lithium ions return to the anode side, attempting to deposit onto the surface of a current collector or the unused lithium foil.

In certain embodiments, the disclosure provides a lithium metal secondary battery comprising a cathode, an anode, an electrolyte-separator assembly disposed between the cathode and the anode, wherein the anode comprises: (A) an anode current collector (substantially free of lithium on the current collector surface when the cell is made); and (B) an anode-protecting layer supported by the anode current collector and in ionic contact with the electrolyte-separator assembly, having a thickness from 10 nm to 500 μm and comprising an electrically and ionically conducting network of cross-linked polymer chains having a lithium ion conductivity from $10^{-8}$ to $5 \times 10^{-2}$ S/cm and an electron conductivity from $10^{-8}$ to $10^3$ S/cm; wherein the battery does not include lithium-sulfur battery or lithium-selenium battery. The lithium ion source may be implemented in the cathode active material (as in a typical lithium-ion battery) or in the anode side (e.g. as a lithium foil or lithium coating coated on the surface of a current collector).

In certain embodiments, the conducting network of cross-linked polymer chains comprises a conjugated polymer selected from polyacetylene, polythiophene, poly(3-alkyl-thiophenes), polypyrrole, polyaniline, poly(isothianaphthene), poly(3,4-ethylenedioxythiophene), alkoxy-substituted poly(p-phenylene vinylene), poly(2,5-bis (cholestanoxy)phenylene vinylene), poly(p-phenylene vinylene), poly(2,5-dialkoxy) paraphenylene vinylene, poly [(1,4-phenylene-1,2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof.

In some embodiments, the electrolyte-separator assembly comprises an electrolyte or a combination of a porous separator and an electrolyte in ionic contact with the anode and the cathode. When the electrolyte contains a solid state electrolyte, a porous separator or membrane may or may not be necessary. A porous separator is normally required if the electrolyte is a liquid or gel electrolyte.

In certain embodiments, the electrolyte is selected from organic liquid electrolyte, ionic liquid electrolyte, polymer gel electrolyte, solid-state electrolyte, quasi-solid electrolyte having a lithium salt dissolved in an organic or ionic liquid with a lithium salt concentration preferably higher than 2.0 M (from 2.0 M to 14 M), or a combination thereof.

Preferably, the anode active material layer, the anode-protecting layer, the electrolyte (e.g. solid-state electrolyte) or electrolyte/separator assembly, and the cathode layer are laminated together in such a manner (e.g. roll-pressed together) that the resulting cell is under a compressive stress or strain for the purpose of maintaining a good contact between the anode active material layer and the anode-protecting layer.

In the lithium metal secondary battery, the non-solid state electrolyte is selected from organic liquid electrolyte, ionic liquid electrolyte, polymer gel electrolyte, quasi-solid electrolyte having a lithium salt dissolved in an organic or ionic liquid with a lithium salt concentration higher than 2.0 M (from 2.0 M to 14 M; typically from 2.5 M to 10 M; and more typically from 3.5M to 7 M), or a combination thereof.

It is well-known in the art that a porous separator may not be necessary if the electrolyte is a solid-state electrolyte; but, a porous separator is normally required in order to electronically separate the anode from the cathode if the electrolyte contains a liquid ingredient, such as in an organic liquid electrolyte, ionic liquid electrolyte, polymer gel electrolyte (polymer+liquid solvent), and quasi-solid electrolyte. The invented conducting polymer network layer, in a dried or gel state, plays the roles of protecting the lithium anode, preventing lithium dendrite formation and penetration, provides an environment conducive to uniform and uninterrupted transport and re-deposition of lithium ions, etc.

The foil or coating of lithium or lithium alloy may be supported by a current collector (e.g. a Cu foil, a Ni foam, a porous layer of nano-filaments, such as graphene sheets, carbon nanofibers, carbon nano-tubes, etc.).

It may be noted that lithium foil/coating layer may decrease in thickness due to dissolution of lithium into the electrolyte to become lithium ions as the lithium battery is discharged, creating a gap between the current collector and the protective layer if the protective layer were not elastic. Such a gap would make the re-deposition of lithium ions back to the anode impossible. We have observed that the instant conductive polymer network layer is capable of expanding or shrinking congruently or conformably with the anode layer. This capability helps to maintain a good contact between the current collector (or the lithium film itself) and the protective layer, enabling the re-deposition of lithium ions without interruption. The elastic polymer foam may further contain a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl) imide, lithium bis(fluorosulfonyl)imide, lithium trifluoromethanesulfonimide (LiTFSI), an ionic liquid-based lithium salt, or a combination thereof.

In some embodiments, the conductive polymer network further contains a lithium ion-conducting additive dispersed therein, wherein the lithium ion-conducting additive is selected from $Li_2CO_3$, $Li_2O$, $Li_2C_2O_4$, LiOH, LiX, $ROCO_2Li$, $HCOLi$, $ROLi$, $(ROCO_2Li)_2$, $(CH_2OCO_2LO_2$, $Li_2S$, $Li_xSO_y$, or a combination thereof, wherein x=F, Cl, I, or Br, R=a hydrocarbon group, $0<x\le1$, $1\le y\le4$.

In certain embodiments, the anode-protecting layer comprises from 0.01% to 50% of an electrically non-conducting reinforcement material dispersed therein, wherein the reinforcement material is selected from a glass fiber, ceramic fiber, polymer fiber, or a combination thereof. The electrically non-conducting reinforcement may also be selected from glass particles, ceramic particles, polymer particles, etc. The reinforcement material can increase the mechanical strength and the lithium dendrite penetration resistance of the elastomer layer.

The cathode active material may be selected from an inorganic material, an organic material, a polymeric material, or a combination thereof. The inorganic material may be selected from a metal oxide, a metal phosphate, a metal silicide, a metal selenide, a metal sulfide, sulfur, an alkali metal polysulfide, selenium, an alkali metal polyselenide, a Se/S alloy or mixture, or a combination thereof.

The inorganic material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y\le1$.

In certain preferred embodiments, the inorganic material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphthylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAM), calixquinone, $Li_4C_6O_6$, $Li_2C_6O_6$, $Li_6C_6O_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

In certain embodiments, the cathode active material comprises a sulfur-containing material selected from a sulfur-carbon hybrid, sulfur-graphite hybrid, sulfur-graphene hybrid, conducting polymer-sulfur hybrid, metal sulfide, sulfur compound, selenium-carbon hybrid, selenium-graphite hybrid, selenium-graphene hybrid, conducting polymer-selenium hybrid, metal selenide, selenium compound, or a combination thereof. These cathode materials can be used in a Li—S cell, Li—Se cell, and Li—S/Se cell. The Li—S/Se cell contains S/Se mixture or S/Se alloy as a cathode active material.

The metal sulfide may contain $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M is selected from Li, Na, K, Mg, Zn, Cu, Ti, Ni, Co, Fe, or Al. The metal sulfide may contain $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, and a combination thereof.

The cathode active material is preferably in a form of nanoparticle (spherical, ellipsoidal, and irregular shape), nanowire, nanofiber, nanotube, nanosheet, nanobelt, nanoribbon, nanodisc, nanoplatelet, or nanohorn having a thickness or diameter less than 100 nm. These shapes can be collectively referred to as "particles" unless otherwise specified or unless a specific type among the above species is desired. Further preferably, the cathode active material has a dimension less than 50 nm, even more preferably less than 20 nm, and most preferably less than 10 nm. In some embodiments, one particle or a cluster of particles may be coated with or embraced by a layer of carbon disposed between the particle(s) and/or a sulfonated elastomer composite layer (an encapsulating shell).

The cathode layer may further contain a graphite, graphene, or carbon material mixed with the cathode active material particles. The carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof. Graphene may be selected from pristine graphene, graphene oxide, reduced graphene oxide, graphene fluoride, hydrogenated graphene, nitrogenated graphene, functionalized graphene, etc.

The cathode active material particles may be coated with or embraced by a conductive protective coating, selected from a carbon material, graphene, electronically conductive polymer, conductive metal oxide, or conductive metal coating.

The present disclosure also provides a lithium metal-air battery comprising an air cathode, an anode comprising the anode-protecting layer as defined above, and a porous separator or membrane or solid-state electrolyte disposed between the anode and the air cathode. In the air cathode, oxygen from the open air (or from an oxygen supplier external to the battery) is the primary cathode active material. The air cathode needs an inert material to support the lithium oxide material formed at the cathode. The applicants have surprisingly found that an integrated structure of conductive nano-filaments can be used as an air cathode intended for supporting the discharge product (e.g., lithium oxide).

Hence, a further embodiment of the present disclosure is a lithium metal-air battery, wherein the air cathode comprises an integrated structure of electrically conductive nanometer-scaled filaments that are interconnected to form a porous network of electron-conducting paths comprising interconnected pores, wherein the filaments have a transverse dimension less than 500 nm (preferably less than 100 nm). These nano-filaments can be selected from carbon nano-tubes (CNTs), carbon nano-fibers (CNFs), graphene sheets, carbon fibers, graphite fibers, etc.

The disclosure also provides a method of manufacturing a lithium battery, the method comprising: (a) providing a cathode active material layer and an optional cathode current collector to support the cathode active material layer; (b) providing an anode active material layer (containing a lithium metal or lithium alloy foil or coating) and an optional anode current collector to support the lithium metal or lithium alloy foil or coating; (c) providing an electrolyte in ionic contact with the anode active material layer and the cathode active material layer; (d) providing an anode-protecting layer having a thickness from 1 nm to 100 μm (preferably from 10 nm to 10 μm) and comprising an electrically and ionically conducting network of cross-linked polymer chains having a lithium ion conductivity from $10^{-8}$ to $5 \times 10^{-2}$ S/cm and an electron conductivity from $10^{-8}$ to $10^3$ S/cm. This anode-protecting layer is disposed between the lithium metal or lithium alloy foil/coating and a lithium ion-permeable membrane or a solid state electrolyte layer.

The disclosure also provides a method of improving the cycle-life of a lithium metal secondary battery. The method comprises implementing a conducting polymer network-based anode-protecting layer between an anode active material layer and a porous separator or solid electrolyte in the battery. The anode-protecting layer comprises an electrically and ionically conducting network of cross-linked polymer chains having a lithium ion conductivity from $10^{-8}$ to $5 \times 10^{-2}$ S/cm and an electron conductivity from $10^{-8}$ to $10^3$ S/cm. This conducting network may be in a dried state (without a solvent impregnated therein) or in a gel state (the network of conducting polymer chains being permeated by and swollen with a fluid (e.g. a solvent, an ionic liquid, possibly plus some lithium salt).

In some embodiments, the conducting network of cross-linked polymer chains comprises a conjugated polymer selected from polyacetylene, polythiophene, poly(3-alkyl-thiophenes), polypyrrole, polyaniline, poly(isothianaphthene), poly(3,4-ethylenedioxythiophene), alkoxy-substituted poly(p-phenylene vinylene), poly(2,5-bis (cholestanoxy) phenylene vinylene), poly(p-phenylene vinylene), poly(2,5-dialkoxy) paraphenylene vinylene, poly [(1,4-phenylene-1,2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof.

In the above-defined method, the step of implementing an anode-protecting layer may be conducted by depositing a layer of a network of cross-linked polymer chains onto one primary surface of the anode active material layer. This step comprises optionally compressing the protected anode to improve a contact between the anode-protecting layer and the anode active material layer, followed by combining the protected anode and the cathode together to form the lithium metal secondary battery. A good contact between the anode active material layer and the anode-protecting layer is essential to reducing internal resistance.

In certain embodiments, the step of implementing the anode-protecting layer is conducted by (i) preparing an anode active material layer; (ii) preparing a free-standing layer comprising a conducting network of cross-linked polymer chains; and (iii) combining the anode active material layer, the anode-protecting layer, a cathode, and an electrolyte together to form the lithium metal secondary battery. A compressive stress may be advantageously applied (e.g. via press-rolling) to improve the contact between the anode-protecting layer and the anode active material layer to be protected.

In certain embodiments, the procedure of providing an anode-protecting layer contains providing a mixture/blend/composite of a network of conducting polymer chains with a lithium-ion conducting material, a reinforcement material (e.g. glass fibers, polymer fibers, etc.), or a combination thereof.

In this mixture/blend/composite, the lithium ion-conducting material is dispersed in the network of conducting polymer chains and is preferably selected from $Li_2CO_3$, $Li_2O$, $Li_2C_2O_4$, LiOH, LiX, $ROCO_2U$, HCOLi, ROLi, $(ROCO_2U)_2$, $(CH_2OCO_2U)_2$, $Li_2S$, $Li_xSO_y$, or a combination thereof, wherein X=F, Cl, I, or Br, R=a hydrocarbon group, $0<x\le1$, $1\le y\le4$. In some embodiments, the lithium ion-conducting material is dispersed in the network of conducting polymer chains and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3 SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoroethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The anode-protecting layer implemented between the anode active layer and the porous separator or solid electrolyte is mainly for the purpose of reducing or eliminating the lithium metal dendrite by providing a more stable Li metal-electrolyte interface that is more conducive to uniform deposition of Li metal during battery charges. The anode-protecting layer also acts to block the penetration of any dendrite, if initiated, from reaching the cathode. The anode-protecting layer, comprising network of crosslinked polymer chains, also appear to be capable of shrinking or expanding conformably, responsive to the thickness increase or decrease of the anode active material layer. Other advantages will become more transparent later.

The lithium metal secondary battery may comprise a rechargeable lithium metal cell, a lithium-sulfur cell, a lithium-selenium cell, a lithium-sulfur/selenium cell, or lithium-air or lithium-oxygen cell.

In summary, the present disclosure also provides a method of improving a cycle-life of a lithium metal secondary battery comprising a cathode having a cathode active material layer, an anode, and an electrolyte-separator assembly disposed between the cathode and the anode. In some embodiments, the method comprises a procedure of implementing an anode-protecting layer between an anode active material layer or an anode current collector of the anode and the porous separator-electrolyte assembly, wherein the anode-protecting layer is in a physical contact with the anode active material layer or the anode current collector, has a thickness from 10 nm to 500 μm, and comprises an electrically and ionically conducting network of cross-linked polymer chains having a lithium ion conductivity from $10^{-8}$ to $5\times10^{-2}$ S/cm and an electron conductivity from $10^{-8}$ to $10^3$ S/cm and wherein the anode active material layer contains a layer of lithium or lithium alloy having greater than 70% by weight of lithium metal in the lithium alloy, in a form of a foil, coating, or aggregate of multiple particles, as an anode active material.

DESCRIPTION OF THE PREFERRED EMBODIMENTS

Figure 1:
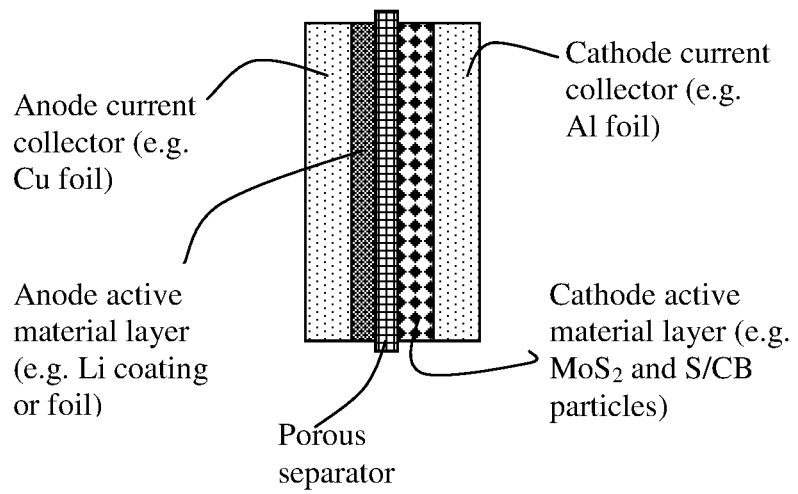
FIG. 1 Schematic of a prior art lithium metal battery cell, containing an anode layer (a thin Li foil or Li coating deposited on a surface of a current collector, Cu foil), a porous separator, and a cathode active material layer, which is composed of particles of a cathode active material, a conductive additive (not shown) and a resin binder (not shown). A cathode current collector supporting the cathode active layer is also shown.

This disclosure is directed at a lithium metal secondary battery, which is preferably based on an organic electrolyte, a polymer gel electrolyte, an ionic liquid electrolyte, a quasi-solid electrolyte, or a solid-state electrolyte. The shape of a lithium metal secondary battery can be cylindrical, square, button-like, etc. The present disclosure is not limited to any battery shape or configuration or any type of electrolyte. The invented lithium secondary battery may be selected from any battery that makes use of lithium metal as the primary anode active material, including the lithium-sulfur cell, lithium-selenium cell, lithium sulfur/selenium cell, lithium-air cell, and the lithium rechargeable batteries (e.g. those lithium-ion cells, but having lithium metal to replace graphite as the main anode active material).

The disclosure provides a lithium metal secondary battery, comprising a cathode, an anode, an anode-protecting layer disposed between the anode and a porous separator or a solid-state electrolyte (in lieu of a porous separator).

In certain embodiments, the anode comprises: (a) a layer of lithium or lithium alloy having greater than 70% by weight of lithium metal in the lithium alloy (in the form of a foil, coating, or multiple particles aggregated together) as an anode active material layer; and (b) an anode-protecting layer, in contact with the anode active material layer, having a thickness from 10 nm to 500 µm and comprising an electrically and ionically conducting network of cross-linked polymer chains having a lithium ion conductivity from $10^{-8}$ to $5 \times 10^{-2}$ S/cm and an electron conductivity from $10^{-8}$ to $10^3$ S/cm. The requirement of the lithium alloy having greater than 70% by weight of lithium metal in the lithium alloy has essentially excluded those intercalation types of anode active materials (e.g. graphite, Si, and Ge, etc.) commonly used in the conventional lithium-ion batteries.

The foil or coating of lithium or lithium alloy, as the anode active material layer or electrode, may be supported by a current collector (e.g. a Cu foil, a Ni foam, a porous layer of nano-filaments, such as membrane, paper, or fabric of graphene sheets, carbon nanofibers, carbon nano-tubes, etc. forming a 3D interconnected network of electron-conducting pathways).

In certain embodiments, the disclosure provides a lithium metal secondary battery comprising a cathode, an anode, an electrolyte-separator assembly disposed between the cathode and the anode, wherein the anode comprises: (A) an anode current collector; and (B) an anode-protecting layer supported by the anode current collector and in ionic contact with the electrolyte-separator assembly, having a thickness from 10 nm to 500 µm and comprising an electrically and ionically conducting network of cross-linked polymer chains having a lithium ion conductivity from $10^{-8}$ to $5 \times 10^{-2}$ S/cm and an electron conductivity from $10^{-8}$ to $10^3$ S/cm. The lithium ion source may be implemented in the cathode active material (as in a typical lithium-ion battery) or in the anode side (e.g. as a lithium foil or lithium coating coated on the surface of a current collector).

Preferably, the conducting network of cross-linked polymer chains comprises a conjugated polymer selected from polyacetylene, polythiophene, poly(3-alkylthiophenes), polypyrrole, polyaniline, poly(isothianaphthene), poly(3,4-ethylenedioxythiophene), alkoxy-substituted poly(p-phenylene vinylene), poly(2,5-bis(cholestanoxy) phenylene vinylene), poly(p-phenylene vinylene), poly(2,5-dialkoxy) paraphenylene vinylene, poly[(1,4-phenylene-1,2-diphenyl-vinylene)], poly(3',7'-dimethyloctyloxy phenylene vinylene), polyparaphenylene, polyparaphenylene, polyparaphenylene sulphide, polyheptadiyne, poly(3-hexyl-thiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof. The conducting network of cross-linked polymer chains may be in a dried state or may be impregnated with a liquid (e.g. organic solvent, ionic solid, etc.) to form a gel state.

In some embodiments, the electrolyte-separator assembly comprises an electrolyte or a porous separator and an electrolyte in ionic contact with the anode and the cathode. When the electrolyte contains a solid state electrolyte, a porous separator or membrane may or may not be necessary. A porous separator is normally required if the electrolyte is a liquid or gel electrolyte.

Also herein provided is a method of improving a cycle-life of a lithium metal secondary battery, the method comprising a procedure of implementing an anode-protecting layer between an anode active material layer (or an anode current collector) and a porous separator-electrolyte assembly, wherein the anode-protecting layer is in a physical contact with the anode active material layer (or the anode current collector), has a thickness from 10 nm to 500 µm, and comprises a conducting network of cross-linked polymer chains and wherein the anode active material layer contains a layer of lithium or lithium alloy, in a form of a foil, coating, or aggregate of multiple particles, as an anode active material. In certain embodiments, the lithium metal does not exist initially when the cell is made; the needed lithium can come from the cathode side and deposit on a surface of a current collector when the cell undergoes the first charge.

Preferably, the anode-protecting layer is a discrete layer (not to be dissolved in the electrolyte) that is disposed between the anode current collector (e.g. Cu foil) or anode active material layer (e.g. Li foil) and the porous separator or solid state electrolyte. The anode-protecting layer may contain a liquid electrolyte that permeates or impregnates into the conducting network of cross-linked polymer chains.

We have discovered that the anode-protecting layer provides several unexpected benefits: (a) the formation of dendrite has been essentially eliminated; (b) uniform deposition of lithium back to the anode side is readily achieved; (c) the layer ensures smooth and uninterrupted transport of lithium ions from/to the lithium foil/coating layer (or the anode current collector layer) and through the interface between the lithium foil/coating and the protective layer with minimal interfacial resistance; (d) significant reduction in the amount of dead lithium particles near the Li foil; and (e) cycle stability can be significantly improved and cycle life increased.

In a conventional lithium metal cell, as illustrated in FIG. 1, the anode active material (lithium) is deposited in a thin film form or a thin foil form directly onto an anode current collector (e.g. a Cu foil). The battery can be a lithium metal battery, lithium sulfur battery, lithium-air battery, lithium-selenium battery, etc. As previously discussed in the Background section, these lithium secondary batteries have the dendrite-induced internal shorting and "dead lithium" issues at the anode.

Figure 2:
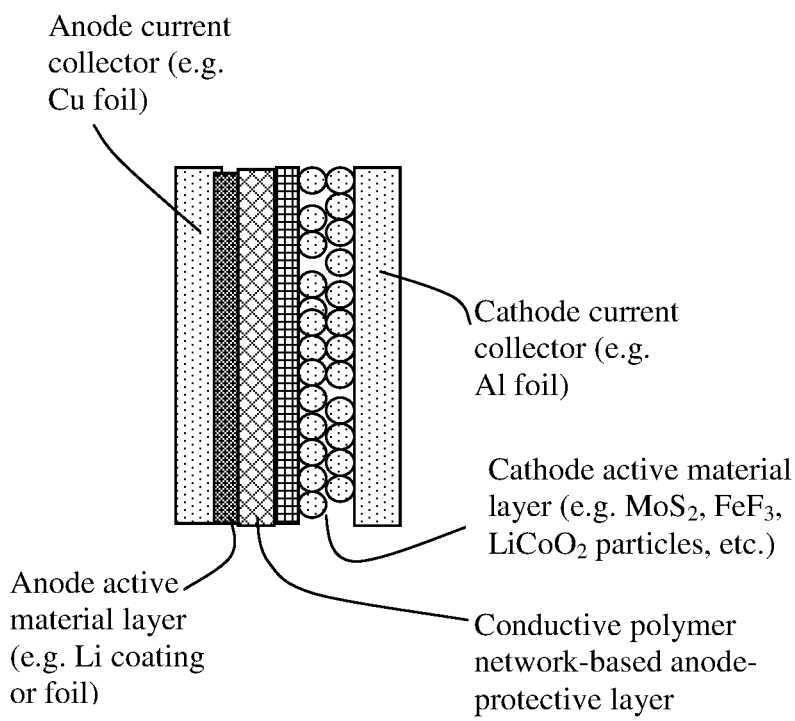
FIG. 2 Schematic of a presently invented lithium metal battery cell containing an anode layer (a thin Li foil or Li coating deposited on a surface of a current collector, Cu foil), a sulfonated elastomer composite foam-based anode-protecting layer, a porous separator/electrolyte layer (or a layer of solid-state electrolyte), and a cathode active material layer, which is composed of particles of a cathode active material, a conductive additive (not shown) and a resin binder (not shown). A cathode current collector supporting the cathode active layer is also shown.

We have solved these challenging issues that have troubled battery designers and electrochemists alike for more than 30 years by developing and implementing an anode-protecting layer disposed between the lithium foil/coating and the separator/electrolyte layer. As schematically shown in FIG. 2, one embodiment of the present disclosure is a lithium metal battery cell containing an anode layer (e.g. a thin Li foil or Li coating deposited on a surface of a current collector, such as a layer of graphene foam or a sheet of Cu foil), an anode-protecting layer, and a cathode active material layer, which is composed of particles of a cathode active material, a conductive additive (not shown) and a resin binder (not shown). A cathode current collector (e.g. Al foil) supporting the cathode active layer is also shown in FIG. 2.

The lithium metal or alloy in the anode may be in a form of particles (e.g. surface-protected or surface-stabilized particles of Li or Li alloy).

If a solid state electrolyte is used, it may not be necessary to implement a porous separator membrane between the anode active layer and the cathode. If the cathode side contains some lithium ion source (e.g. Li in $LiCoO_2$ or $LiMn_2O_4$, etc.), the anode side can have only a current collector layer (no Li foil or coating layer when the cell is made) and an conducting polymer network-based protecting layer.

Again, it may be noted that although FIG. 2 shows a lithium coating pre-existing at the anode when the lithium battery is made, this is but one of several embodiments of the instant disclosure. An alternative embodiment is a lithium battery that does not contain a lithium foil or lithium coating at the anode (only an anode current collector, such as a Cu foil or a graphene/CNT mat) when the battery is made. The needed amount of lithium to be bounced back and forth between the anode and the cathode is initially stored in the cathode active material (e.g. lithium vanadium oxide $Li_xV_2O_5$, instead of vanadium oxide, $V_2O_5$; or lithium transition metal oxide or phosphate, instead of, say, $MoS_2$). During the first charging procedure of the lithium battery (e.g. as part of the electrochemical formation process), lithium comes out of the cathode active material, migrates to the anode side, and deposits on the anode current collector. The presence of the presently invented protective layer enables uniform deposition of lithium ions on the anode current collector surface. Such an alternative battery configuration avoids the need to have a layer of lithium foil or coating being present during battery fabrication. Bare lithium metal is highly sensitive to air moisture and oxygen and, thus, is more challenging to handle in a real battery manufacturing environment. This strategy of pre-storing lithium in the lithiated (lithium-containing) cathode active materials, such as $Li_xV_2O_5$ and $Li_2S_x$, makes all the materials safe to handle in a real manufacturing environment. Cathode active materials, such as $Li_xV_2O_5$ and $Li_2S_x$, are typically less air-sensitive.

The presently invented lithium secondary batteries can contain a wide variety of cathode active materials. The cathode active material layer may comprise a cathode active material selected from an inorganic material, an organic material, a polymeric material, or a combination thereof. The inorganic material may be selected from a metal oxide, metal phosphate, metal silicide, metal selenide, transition metal sulfide, or a combination thereof.

The inorganic cathode active material may be selected from a lithium cobalt oxide, lithium nickel oxide, lithium manganese oxide, lithium vanadium oxide, lithium-mixed metal oxide (e.g. the well-known lithium nickel cobalt aluminum oxide, NCA, and lithium nickel cobalt manganese oxide, NCM), lithium iron phosphate, lithium manganese phosphate, lithium vanadium phosphate, lithium mixed metal phosphate, lithium metal silicide, or a combination thereof.

In certain preferred embodiments, the inorganic material as a cathode active material for the lithium battery is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y\leq1$.

In certain preferred embodiments, the inorganic material as a cathode active material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphtylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

In certain embodiments, the cathode active material comprises a sulfur-containing or selenium-containing material selected from a sulfur-carbon hybrid, sulfur-graphite hybrid, sulfur-graphene hybrid, conducting polymer-sulfur hybrid, metal sulfide, sulfur compound, selenium-carbon hybrid, selenium-graphite hybrid, selenium-graphene hybrid, conducting polymer-selenium hybrid, metal selenide, selenium compound, a S/Se alloy, a S/Se mixture, a Se/S compound, or a combination thereof.

It is also advantageous to disperse a high-strength reinforcement material in the anode-protecting material to increase the strength and dendrite-penetrating resistance of the network of crosslinked polymer chains layer. Suitable reinforcement materials include glass fibers, ceramic fibers (e.g. silicon carbide fibers), polymer fibers (e.g. aromatic polyamide fibers such as Kevlar fibers, nylon fibers, ultrahigh molecular weight polyethylene or UHMW-PE fibers, etc.), and ceramic discs, etc.

Typically, a conjugated polymer is originally in a monomer or oligomer state that can be polymerized and cured to form a cross-linked polymer. Prior to curing, these polymers or oligomers may be soluble in an organic solvent to form a polymer solution. Thus, the preparation of the instant protecting layer may begin with an uncured conjugated polymer, reactive monomer, or growing oligomer in a liquid state (e.g. containing an oxidative initiator, a crosslinking agent, and a monomer in a liquid state) to form a reactive solution. An ion-conducting additive or a reinforcement material may be added to this solution to form a suspension. This solution or suspension can then be formed into a thin layer of polymer precursor on a surface of an anode current collector or a surface of a Li foil. The polymer precursor (e.g. oligomer or monomer and initiator, along with a crosslinker and optional dopant) is then polymerized and cured to form a lightly cross-linked conductive polymer. This thin layer of conductive network polymer may be tentatively deposited on a solid substrate (e.g. surface of a polymer or glass), dried, and separated from the substrate to become a free-standing polymer layer. This free-standing layer is then laid on a lithium foil/coating or implemented between a lithium film/coating and a cathode layer. Polymer layer formation can be accomplished by using one of several procedures well-known in the art; e.g. spraying, spray-painting, printing, coating, extrusion-based film-forming, casting, etc.

One may dispense and deposit a layer of a conducting network polymer onto a primary surface of the anode active material layer. Further alternatively, one may prepare a separate free-standing discrete layer of the conducting network polymer first. This conducting network polymer layer is then laminated between an anode active material layer (or anode current collector layer alone), a porous separator layer/electrolyte assembly, and a cathode to form a battery cell.

The disclosure also provides a method of manufacturing a lithium battery, the method comprising: (a) providing a cathode active material layer and an optional cathode current collector to support the cathode active material layer thereon; (b) providing an anode current collector layer alone or an anode active material layer (e.g. containing a lithium metal or lithium alloy foil or coating) supported by an anode current collector to support the lithium metal or lithium alloy foil or coating; and (c) providing an anode-protecting layer comprising an electrically and ionically conducting network of cross-linked polymer chains having a lithium ion conductivity from $10^{-8}$ to $5 \times 10^{-2}$ S/cm and an electron conductivity from $10^{-8}$ to $10^3$ S/cm, and having a thickness from 10 nm to 500 μm (preferably from 10 nm to 100 μm, most preferably less than 10 μm) and a porous separator/electrolyte assembly, wherein the anode-protecting layer is disposed between the porous separator/electrolyte assembly and the anode active material layer (or the current collector) and in physical contact therewith and wherein the electrolyte ionically connects the anode active material layer and the cathode active material layer.

The disclosure also provides a method of improving the cycle-life of a lithium metal secondary battery. The method comprises implementing an anode-protecting layer between an anode active material layer and a separator-electrolyte assembly (e.g. a porous membrane or a solid state electrolyte layer). The anode-protecting layer, having a thickness from 10 nm to 500 μm, comprises an electrically and ionically conducting network of cross-linked polymer chains having a lithium ion conductivity from $10^{-8}$ to $5 \times 10^{-2}$ S/cm and an electron conductivity from $10^{-8}$ to $10^3$ S/cm.

In certain embodiments, the presently invented lithium secondary battery comprises at least the following layers: an anode current collector (e.g. a Cu foil or a graphene foam) or an anode active material layer (e.g. a discrete lithium foil, a lithium coating layer, or a layer of lithium particles) supported by an anode current collector, an anode-protecting layer (network of crosslinked conductive polymer chains) substantially fully covering the anode active material layer, an electrolyte or combined porous separator/electrolyte, a cathode active material layer, and an optional cathode current collector (e.g. Al foil, graphene paper sheet, etc.).

There are many different sequences with which these individual layers may be produced and combined together to make a battery cell. For instance, one may produce all components in a free-standing film form and then combine them together. Alternatively, one may produce certain components in single free-standing films but other components in a 2-layer or 3-layer structure, followed by combining these components and structures together. For instance, one may spray, cast, or coat a layer of a desired conducting network polymer onto a primary surface of an anode current collector to form a two-layer structure. This two-layer structure is then laminated with other components (e.g. a porous separator, a cathode layer, and electrolyte) to form a battery cell. The electrolyte may be added before or during the cell is made (if a solid or semi-solid electrolyte) or after the cell is made (if a liquid electrolyte).

Alternatively, the step of implementing an anode-protecting layer may be conducted by depositing a layer of the desired conducting network polymer onto one primary surface of an anode active material layer. This step includes optionally compressing the protected anode to improve the contact between the anode-protecting layer and the anode active material layer, followed by combining the protected anode, a separator, and a cathode together to form a lithium metal secondary battery. A good contact between the anode active material layer and the anode-protecting layer is essential to reducing internal resistance.

In certain embodiments, the step of implementing an anode-protecting layer is conducted by forming a protecting layer of conducting network polymer, followed by laminating the anode active material layer, the conducting network polymer layer, a porous membrane, a cathode layer, along with the electrolyte to form the lithium metal secondary battery, wherein an optional (but desirable) compressive stress is applied to improve the contact between the anode-protecting layer and the anode active material layer during or after this laminating step.

In some embodiments, the conducting network polymer can form a polymer matrix composite containing a lithium ion-conducting additive dispersed in the elastomer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$. In some embodiments, the conducting network polymer can be mixed with a lithium ion-conducting additive, which contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl) imide, lithium bis(fluorosulfonyl)imide, lithium trifluoromethanesulfonimide (LiTFSI), an ionic liquid-based lithium salt, or a combination thereof.

The electrolyte for a lithium secondary cell may be an organic electrolyte, ionic liquid electrolyte, gel polymer electrolyte, quasi-solid electrolyte (e.g. containing 2M-14 M of a lithium salt in a solvent) or a combination thereof. The electrolyte typically contains an alkali metal salt (lithium salt, sodium salt, and/or potassium salt) dissolved in a solvent.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-methanesulfonate ($NaCF_3SO_3$), potassium trifluoro-methanesulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Among them, $LiPF_6$, $LiBF_4$ and $LiN(CF_3SO_2)_2$ are preferred for Li—S cells, $NaPF_6$ and $LiBF_4$ for Na—S cells, and $KBF_4$ for K—S cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a lithium metal cell.

Example 1: Production of PEDOT:PSS Network-Based Anode-Protecting Layers

Poly(3,4-ethylenedioxythiophene):polystyrene sulfonate (PEDOT:PSS) is a polymer mixture of two ionomers. One component is made up of sodium polystyrene sulfonate (PSS), which is a sulfonated polystyrene. Part of the sulfonyl groups are deprotonated and carry a negative charge. The other component poly(3,4-ethylenedioxythiophene) or PEDOT is a conjugated polymer, polythiophene, which carries positive charges. Together the two charged polymers form a macromolecular salt. The PEDOT/PSS, with a curing agent, was dissolved in water and the solution was cast on a glass surface and dried to form a film. In one example, a 5% by weight of graphene sheets was dispersed in the solution to make a graphene-reinforced conducting polymer network composite film. These films were each laminated between a lithium foil and a porous membrane or solid electrolyte, along with a cathode and other components to make a lithium metal cell.

Example 2: Anode-Protecting Layers Comprising a Conductive Network of Crosslinked Polypyrrole (PPy) Chains The process of example 1 was replicated with PEDOT/PSS being replaced by polypyrrole (PPy) network. The polypyrrole hydrogel was prepared by following the following procedure: Solution A was prepared by mixing 1 mL $H_2O$ and 0.5 mL phytic acid together and then injecting 142 μL pyrrole into the solution, which was sonicated for 1 min. Solution B was prepared by dissolving 0.114 g ammonium persulfate in 0.5 mL $H_2O$. The solution A and B were separately cooled to 4° C. and then solution B was added into solution A quickly to form a reacting precursor solution.

The precursor solution was rapidly coated on a glass surface and reacted to produce a layer of polypyrrole hydrogel. The polypyrrole hydrogel layer was totally dried by removing all of the water content from the gel under vacuum at 60° C. for 24 hours to form a polypyrrole network film.

Example 3: Production of Networks of Crosslinked Polyaniline Chain-Based Anode-Protecting Layers In some embodiments, the precursor may contain a monomer, an initiator, oxidizer or catalyst, a crosslinking agent, and an optional dopant. As an example, 3.6 ml solution A was prepared, which contained 400 mM aniline monomer and 120 mM phytic acid (as a crosslinking agent and a dopant) in water. Subsequently, 1.2 ml solution B, containing 500 mM ammonium persulfate (oxidative initiator), was added into the above solution A and subjected to bath sonication for 1 min. The mixed solution was sprayed to deposit a reacting mass onto a Cu foil surface. In about 3-10 min, the solution changed color from brown to dark green and became viscous and gel-like, indicating in-situ polymerization of aniline monomer to form the PANi hydrogel. The PANi hydrogel layer was totally dried by removing all of the water content from the gel under vacuum at 60° C. for 24 hours to form a PANi network film (as an anode protecting layer) coated on the Cu foil (a current collector). On a separate basis, 3% by weight of CNTs was added into the reacting mass during bath sonication for the formation of a separate layer of CNT-reinforced PANi network.

Examples 4: Heparin-Based Material as a Curing Agent for the Preparation of a Conducting Network of Polyaniline Chains The conducting networks of crosslinked PANi may be produced from a monomer using heparin-based crosslinking agent (e.g. instead of or in addition to phytic acid). Aqueous solutions of heparin (0.21% w/w) were prepared using 5M NaOH. Photo-crosslinkable heparin methacrylate (Hep-MA) precursors were prepared by combining heparin (porcine source, Mw~1719 kDa) incubated with methacrylic anhydride (MA) and adjusted to pH=8. The degree of substitution (DS) of methacrylate groups covalently linked to heparin precursors was measured by 1H nuclear magnetic resonance. The DS was determined from integral ratios of peaks of the methacrylate groups at 6.2 ppm relative to the peak corresponding to methyl groups in heparin at 2.05 ppm.

Solutions used for photo-polymerization were incubated with 2-methyl-1-[4-(hydeoxyethoxy)phenyl]-2-methyl-1-propanone (Irgacure 2959) to create final concentrations of 0.5% (w/w) of photoinitiator. The solution was then cast into thin films on a layer of reduced graphene oxide foam (RGO foam, as a current collector). Gels were photo-crosslinked using UV illumination for 30-60 min ($\lambda$max=365 nm, 10 mW/cm$^2$). Hep-MA/PANI dual-networks were formed by sequentially incubating cross-linked Hep-MA hydrogels in aqueous solutions of ANI ([ANI]$_0$, between 0.1 and 2 M, 10 min) and acidic solutions of APS ([APS]$_0$, between 12.5 mM and 2 M, 20120 min). The gel fraction of Hep-MA/PANI dual networks was recovered by washing in di $H_2O$ after oxidative polymerization. The films were then vacuum-dried at 50° C. for 24 hours to obtain a layer of network of crosslinked PANi chains coated on graphene foam.

Example 5: Lithium Battery Containing a Conductive Network Polymer-Protected Lithium Anode and a Cathode Containing $V_2O_5$ Particles Cathode active material layers were prepared from $V_2O_5$ particles and graphene-embraced $V_2O_5$ particles, respectively. The $V_2O_5$ particles were commercially available. Graphene-embraced $V_2O_5$ particles were prepared in-house. In a typical experiment, vanadium pentoxide gels were obtained by mixing $V_2O_5$ in a LiCl aqueous solution. The Li$^+$-exchanged gels obtained by interaction with LiCl solution (the Li:V molar ratio was kept as 1:1) was mixed with a GO suspension and then placed in a Teflon-lined stainless steel 35 ml autoclave, sealed, and heated up to 180° C. for 12 h. After such a hydrothermal treatment, the green solids were collected, thoroughly washed, ultrasonicated for 2 minutes, and dried at 70° C. for 12 h followed by mixing with another 0.1% GO in water, ultrasonicating to break down nano-belt sizes, and then spray-drying at 200° C. to obtain graphene-embraced $V_2O_5$ composite particulates. Selected amounts of $V_2O_5$ particles and graphene-embraced $V_2O_5$ particles, respectively, were then each made into a cathode layer following a well-known slurry coating process.

The conductive network polymer layers for use as an anode-protecting layer were those prepared in Example 1. A Cu foil was used to support a Li foil as the anode active material layer.

For electrochemical testing, the working electrodes (cathode layers) were prepared by mixing 85 wt. % $V_2O_5$ or 88% of graphene-embraced $V_2O_5$ particles, 5-8 wt. % CNTs, and 7 wt. % polyvinylidene fluoride (PVDF) binder dissolved in N-methyl-2-pyrrolidinoe (NMP) to form a slurry of 5 wt. % total solid content. After coating the slurries on Al foil, the electrodes were dried at 120° C. in vacuum for 2 h to remove the solvent before pressing. Then, the electrodes were cut into a disk ($\phi$=12 mm) and dried at 100° C. for 24 h in vacuum.

Electrochemical measurements were carried out using CR2032 (3V) coin-type cells with lithium metal as the counter electrode (actually an anode of a Li-transition metal oxide cell), Celgard 2400 membrane as separator (for the cell containing no anode-protecting elastomer layer), and 1 M LiPF$_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s. The electrochemical performance of the cells were evaluated by galvanostatic charge/discharge cycling at a current density of 50 mA/g using an Arbin Electrochemical Testing Station.

Figure 3:
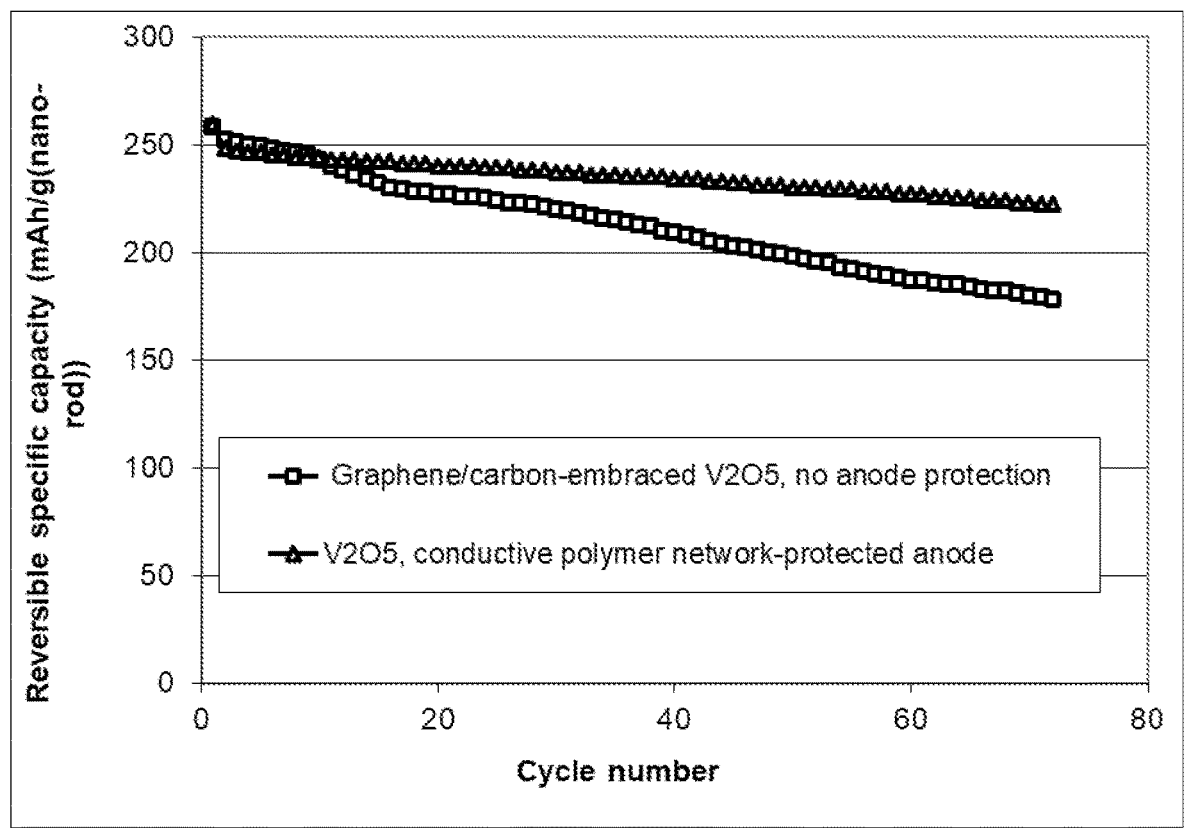
FIG. 3 The specific intercalation capacity curves of two lithium cells: one cell having a cathode containing $V_2O_5$ particles and a conductive polymer network-based anode-protecting layer disposed between the anode active material layer (Li foil) and the cathode layer and the other cell having a cathode containing graphene-embraced $V_2O_5$ particles, but having no anode-protecting layer.

Summarized in FIG. 3 are the specific intercalation capacity curves of two lithium cells: one cell having a cathode containing V$_2$O$_5$ particles and a PEDOT:PSS network-based anode-protecting layer disposed between the anode active material layer (Li foil) and the separator layer and the other cell having a cathode containing graphene-embraced V$_2$O$_5$ particles, but having no anode-protecting layer. As the number of cycles increases, the specific capacity of the un-protected cells drops at a much faster rate. In contrast, the presently invented approach of a conductive polymer network-based anode-protecting layer provides the battery cell with a stable cycling behavior. These data have clearly demonstrated the surprising and superior performance of the presently invented anode protection approach for the lithium metal layer.

The PEDOT:PSS network-based anode-protecting layer appears to be capable of reversibly deforming to a great extent without breakage when the lithium foil decreases in thickness during battery discharge. This elasticity feature, unexpected of a network polymer, enables the protecting layer to remain in a good contact with the lithium metal or current collector when the battery is discharged. Since there is no gap between the elastic protecting layer, the returning lithium ions during a subsequent recharge can more effectively deposit back to the current collector or the lithium metal supported thereon. The protective layer also prevents the continued reaction between liquid electrolyte and lithium metal at the anode, reducing the problem of continuing loss in lithium and electrolyte. This also enables a significantly more uniform deposition of lithium ions upon returning from the cathode during a battery re-charge step; hence, no lithium dendrite. These were observed by using SEM to examine the surfaces of the electrodes recovered from the battery cells after some numbers of charge-discharge cycles.

Figure 4:
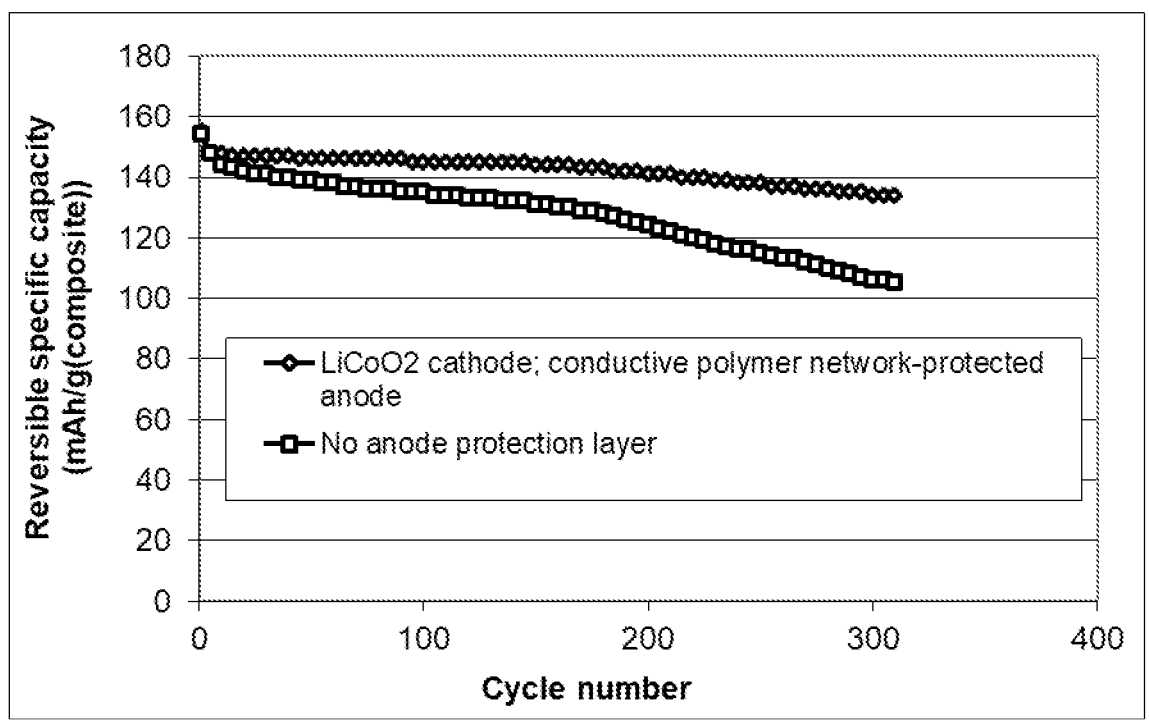
FIG. 4 The specific capacity values of two lithium-$LiCoO_2$ cells (initially the cell being lithium-free); one cell featuring a conductive polymer network layer at the anode and the other cell containing no anode protection layer.

Example 6: Conductive Network of Crosslinked Polypyrrole (PPy) Chains Implemented in the Anode of a Lithium-LiCoO$_2$ Cell The conducting polymer network-based lithium-protecting layer was based on the conductive network of cross-linked polypyrrole (PPy) chains prepared according to a procedure used in Example 2. FIG. 4 shows the specific lithium intercalation capacity of two lithium-LiCoO$_2$ cells (initially the cell being substantially lithium-free); one cell featuring a layer of conductive network of crosslinked polypyrrole (PPy) chains at the anode and the other cell containing no anode protection layer. These data indicate that the cell having a conductive network of crosslinked polypyrrole (PPy) chains-based anode-protecting layer offers significantly more stable cycling behavior. The protecting layer also acts to isolate the liquid electrolyte from the lithium coating yet still allowing for easy diffusion of lithium ions.

Example 7: Li Metal Cells Containing Transition Metal Fluoride Nanoparticle-Based Cathode and a PANi Network-Based Anode-Protecting Layer Commercially available powders of CoF$_3$, MnF$_3$, FeF$_3$, VF$_3$, VOF$_3$, TiF$_3$, and BiF$_3$ were subjected to high-intensity ball-milling to reduce the particle size down to approximately 0.5-2.3 μm. Each type of these metal fluoride particles, along with graphene sheets (as a conductive additive), was then added into an NMP and PVDF binder suspension to form a multiple-component slurry. The slurry was then slurry-coated on Al foil to form cathode layers.

Figure 5:
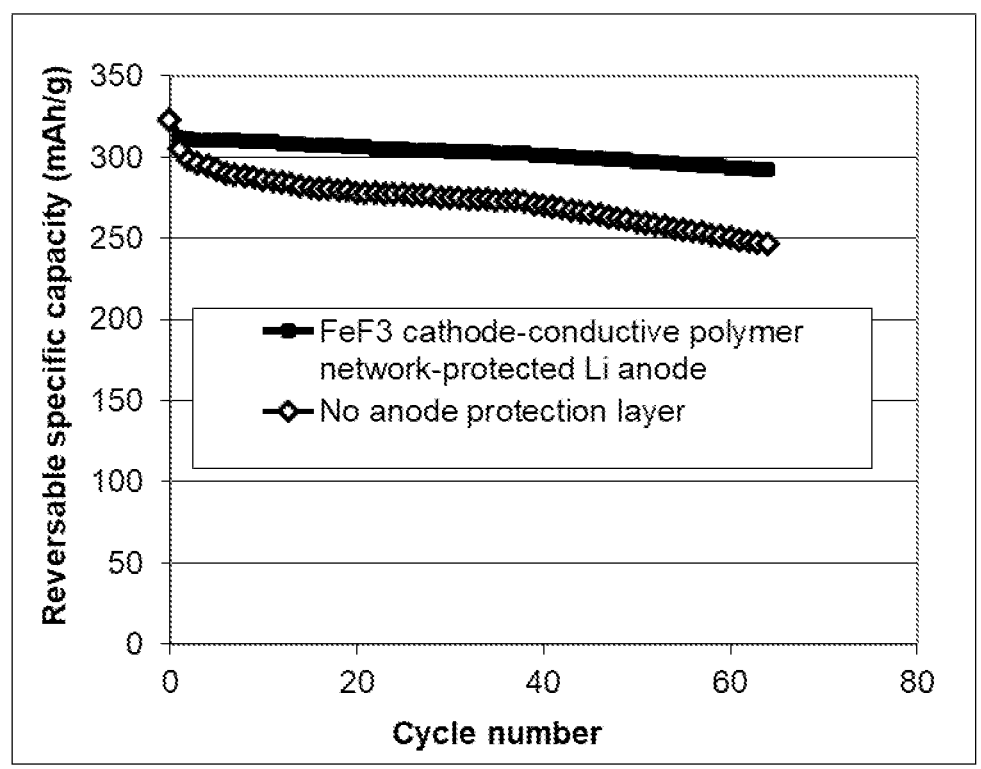
FIG. 5 The discharge capacity curves of two coin cells having a $FeF_3$-based of cathode active materials: (1) one cell having a conductive polymer network-protected anode; and (2) the other cell having no anode-protecting layer.

Shown in FIG. 5 are the discharge capacity curves of two coin cells having the same cathode active material (FeF$_3$), but one cell having a PANi network-based anode-protecting layer (prepared in Example 3) and the other cell having no protective layer. These results have clearly demonstrated that the conductive network polymer layer protection strategy provides the best protection against capacity decay of a lithium metal battery.

The conductive network polymer layer appears to be capable of reversibly deforming without breakage when the anode layer expands and shrinks during charge and discharge. The conductive network polymer layer also prevents continued reaction between the liquid electrolyte and the lithium metal. No dendrite-like features were found with the anode being protected by a conductive network polymer composite. This was confirmed by using SEM to examine the surfaces of the electrodes recovered from the battery cells after some numbers of charge-discharge cycles.

Example 8: Li-Organic Cell Containing a Naphthalocyanine/Reduced Graphene Oxide (FePc/RGO) Particulate Cathode and a Protected Li Foil Anode Particles of combined FePc/graphene sheets were obtained by ball-milling a mixture of FePc and RGO in a milling chamber for 30 minutes. The resulting FePc/RGO mixture particles were potato-like in shape. Two lithium cells were prepared, each containing a Li foil anode, and a cathode layer of FePc/RGO particles; one cell containing an anode-protecting layer (prepared in Example 4), and the other having no anode-protecting layer.

Figure 6:
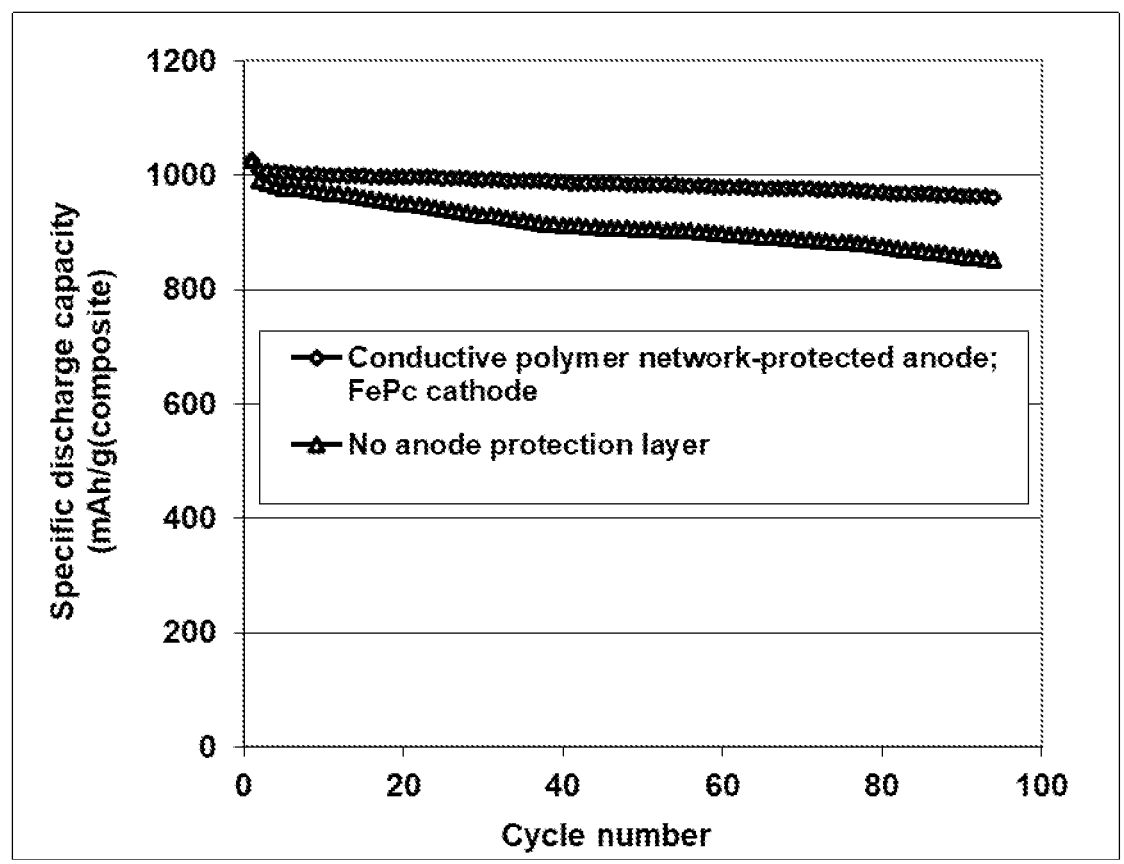
FIG. 6 Specific capacities of two lithium-FePc (organic) cells, each having Li foil as an anode active material and FePc/RGO mixture particles as the cathode active material (one cell containing a conductive polymer network protected anode and the other no anode protection layer).

The cycling behaviors of these 2 lithium cells are shown in FIG. 6, which indicates that the lithium-organic cell having a conductive network polymer-based protection layer (prepared in Example 4) exhibits a significantly more stable cycling response. These protective layers reduce or eliminate the undesirable reactions between the lithium metal and the electrolyte, yet the conductive network polymer layer itself remains in ionic contact with the protected lithium metal and is permeable to lithium ions. This approach has significantly increased the cycle life of all lithium-organic batteries.

Example 9: Lithium-Sulfur Cell Having a Sulfur-Impregnated Activated Carbon Fibers as the Cathode Active Material A chemical impregnation method was herein utilized to prepare S-impregnated carbon fibers that have been chemically activated. The procedure began with adding 0.58 g Na$_2$S into a flask that had been filled with 25 ml distilled water to form a Na$_2$S solution. Then, 0.72 g elemental S was suspended in the Na$_2$S solution and stirred with a magnetic stirrer for about 2 hours at room temperature. The color of the solution changed slowly to orange-yellow as the sulfur dissolved. After dissolution of the sulfur, a sodium polysulfide ($Na_2S_x$) solution was obtained (x=4-10).

Subsequently, a sulfur-impregnated carbon fiber sample was prepared by a chemical impregnation method in an aqueous solution. First, 180 mg of expansion-treated carbon fibers was suspended in 180 ml ultrapure water with a surfactant and then sonicated at 50° C. for 5 hours to form a stable carbon fiber dispersion. Subsequently, the $Na_2S_x$ solution was added to the above-prepared dispersions in the presence of 5 wt % surfactant cetyl trimethyl-ammonium bromide (CTAB), the as-prepared carbon fiber/$Na_2S_x$ blended solution was sonicated for another 2 hours and then titrated into 100 ml of 2 mol/L HCOOH solution at a rate of 30-40 drops/min and stirred for 2 hours. Finally, the precipitate was filtered and washed with acetone and distilled water several times to eliminate salts and impurities. After filtration, the precipitate was dried at 50° C. in a drying oven for 48 hours. The reaction may be represented by the following reaction: $S_x^{2-}+2H^+\rightarrow(x-1) S+H_2S$. The resulting sulfur-impregnated carbon fibers were used as a cathode active material for a lithium-sulfur cell, wherein the anode is a thin lithium metal coated on a graphene-based current collector.

Figure 7:
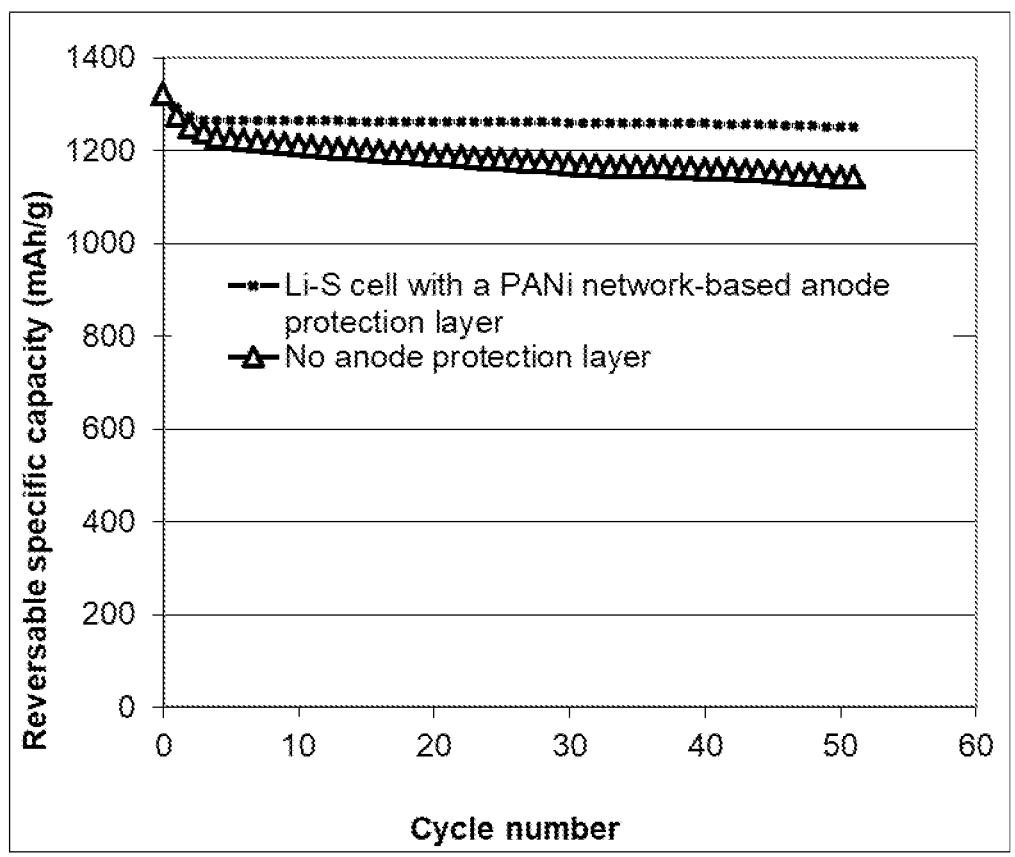
FIG. 7 The cathode specific capacity values of two Li—S cells having sulfur-impregnated activated carbon fibers as the cathode active material; one cell featuring a PANi network-based anode-protecting layer and the other cell does not have an anode-protecting layer.

The cycling behaviors of these 2 lithium cells are shown in FIG. 7, which indicates that the lithium-sulfur cell having a conductive network polymer-based protection layer (prepared in Example 3) exhibits a significantly more stable cycling response. These protective layers reduce or eliminate the undesirable reactions between the lithium metal and the electrolyte, yet the conductive network polymer layer itself remains in ionic contact with the protected lithium metal and is permeable to lithium ions. This approach has significantly increased the cycle life of all lithium-organic batteries.

Example 10: Cycle Stability of Various Rechargeable Lithium Battery Cells

In lithium-ion battery industry, it is a common practice to define the cycle life of a battery as the number of charge-discharge cycles that the battery suffers a 20% decay in capacity based on the initial capacity measured after the required electrochemical formation. Summarized in Table 1 below are the cycle life data of a broad array of batteries featuring an anode with or without an anode-protecting layer of a conductive network polymer.

TABLE 1

Cycle life data of various lithium secondary (rechargeable) batteries.

| Sample ID | Anode-protecting elastomer | Type & % of cathode active material | Initial capacity (mAh/g) | Cycle life (No. of cycles) |
|---|---|---|---|---|
| $CuCl_2$-1e | PPy network | 85% by wt. $CuCl_2$ particles (80 nm) + 7% graphite + 8% binder | 540 | 1125 |
| $CuCl_2$-2e | none | 85% by wt. $CuCl_2$ particles (80 nm) + 7% graphite + 8% binder | 536 | 112 |
| $BiF_3$-1e | none | 85% by wt. $BiF_3$ particles + 7% graphene + 8% binder | 275 | 115 |
| $BiF_3$-2e | PPy network + 20% $LiNO_3$ | 85% by wt. $BiF_3$ particles + 7% graphene + 8% binder | 276 | 898 |
| $Li_2MnSiO_4$-1e | PANi network | 85% C-coated $Li_2MnSiO_4$ + 7% CNT + 8% binder | 254 | 1,447 |
| $Li_2MnSiO_4$-2e | none | 85% C-coated $Li_2MnSiO_4$ + 7% CNT + 8% binder | 252 | 543 |
| $Li_6C_6O_6$-1e | PANi network + 5% Kevlar fibers | $Li_6C_6O_6$-graphene ball-milled | 439 | 1,154 |
| $Li_6C_6O_6$-2e | none | $Li_6C_6O_6$-graphene ball-milled | 438 | 116 |
| $MoS_2$-1e | Glass fiber reinforced PANi network | 85% $MoS_2$ + 8% graphite + binder | 224 | 1,088 |
| $MoS_2$-2e | none | 85% $MoS_2$ + 8% graphite + binder | 225 | 156 |

In conclusion, the conductive polymer network-based anode-protecting layer is surprisingly effective in alleviating the problems of lithium metal dendrite formation and lithium metal-electrolyte reactions that otherwise lead to rapid capacity decay and potentially internal shorting and explosion of the lithium secondary batteries. The conductive polymer network layer appears to be capable of expanding or shrinking congruently or conformably with the anode active material layer. This capability helps to maintain a good contact between the current collector (or the lithium film itself) and the protective layer, enabling uniform re-deposition of lithium ions without interruption.

I claim:
1. A lithium metal secondary battery comprising a cathode, an anode, and an electrolyte-separator assembly disposed between said cathode and said anode, wherein said anode comprises:
   a) an anode active material layer containing a layer of lithium or lithium alloy having greater than 70% by weight of lithium metal in said lithium alloy, in a form of a foil, coating, or multiple particles aggregated together, as an anode active material; and
   b) an anode-protecting layer in physical contact with said anode active material layer and in ionic contact with said electrolyte-separator assembly, wherein said anode-protecting layer has a thickness from 10 nm to 500 μm and comprising an electrically and ionically conducting network of cross-linked polymer chains having a lithium ion conductivity from $10^{-8}$ to $5\times10^{-2}$ S/cm and an electron conductivity from $10^{-8}$ to $10^3$ S/cm, wherein said conducting network of cross-linked polymer chains comprises a conjugated polymer selected from poly(3-alkylthiophenes), poly(isothianaphthene), alkoxy-substituted poly(p-phenylene vinylene), poly(2,5-bis(cholestanoxy) phenylene vinylene), poly(2,5-dialkoxy) paraphenylene vinylene, poly[(1,4-phenylene-1,2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4- phenylene), poly(9,9-dioctylfluorene), polyquinoline, a derivative thereof, a copolymer thereof, a sulfonated version thereof, or a combination thereof;
wherein said conducting network of cross-linked polymer chains further contains from 0.1% to 40% by weight of a lithium ion-conducting additive dispersed therein; and
wherein said lithium ion-conducting additive contains a lithium salt selected from lithium perchlorate (LiClO$_4$), litlithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphate (LiPF$_3$(CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

2. A lithium metal secondary battery comprising a cathode, an anode, an electrolyte-separator assembly disposed between said cathode and said anode, wherein said anode comprises:
A) an anode current collector; and
B) an anode-protecting layer supported by said anode current collector and in ionic contact with said electrolyte-separator assembly, wherein said anode-protecting layer has a thickness from 10 nm to 500 μm and comprising an electrically and ionically conducting network of cross-linked polymer chains having a lithium ion conductivity from $10^{-8}$ to $5\times10^{-2}$ S/cm and an electron conductivity from $10^{-8}$ to $10^3$ S/cm, wherein said conducting network of cross-linked polymer chains comprises a conjugated polymer selected from poly(3-alkylthiophenes), poly(isothianaphthene), alkoxy-substituted poly(p-phenylene vinylene), poly(2,5-bis(cholestanoxy) phenylene vinylene), poly(2,5-dialkoxy) paraphenylene vinylene, poly[(1,4-phenylene-1,2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly (3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof;
wherein said conducting network of cross-linked polymer chains further contains from 0.1% to 40% by weight of a lithium ion-conducting additive dispersed therein; and
wherein said lithium ion-conducting additive contains a lithium salt selected from lithium perchlorate (LiClO$_4$), litlithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphate (LiPF$_3$(CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

3. The lithium metal secondary battery of claim 1, wherein said electrolyte is selected from organic liquid electrolyte, ionic liquid electrolyte, polymer gel electrolyte, solid-state electrolyte, quasi-solid electrolyte having a lithium salt dissolved in an organic or ionic liquid with a lithium salt concentration higher than 2.0 M, or a combination thereof.

4. The lithium metal secondary battery of claim 1, wherein said anode-protecting layer further comprises a liquid solvent that permeates into said conducting network of cross-linked polymer chains to form a conductive polymer gel.

5. The lithium metal secondary battery of claim 2, wherein said anode-protecting layer further comprises a liquid solvent that permeates into said conducting network of cross-linked polymer chains to form a conductive polymer gel.

6. A lithium metal secondary battery comprising a cathode, an anode, and an electrolyte-separator assembly disposed between said cathode and said anode, wherein said anode comprises:
a) an anode active material layer containing a layer of lithium or lithium alloy having greater than 70% by weight of lithium metal in said lithium alloy, in a form of a foil, coating, or multiple particles aggregated together, as an anode active material; and
b) an anode-protecting layer in physical contact with said anode active material layer and in ionic contact with said electrolyte-separator assembly, wherein said anode-protecting layer has a thickness from 10 nm to 500 μm and comprising an electrically and ionically conducting network of cross-linked polymer chains having a lithium ion conductivity from $10^{-8}$ to $5\times10^{-2}$ S/cm and an electron conductivity from $10^{-8}$ to $10^3$ S/cm, wherein said conducting network of cross-linked polymer chains further comprises from 0.01% to 50% of an electrically non-conducting reinforcement material dispersed in said conducting network of cross-linked polymer chains to form a conducting network polymer composite, wherein said reinforcement material is selected from a glass fiber, ceramic fiber, polymer fiber, glass particle, ceramic particle, polymer particle, or a combination thereof;
wherein said conducting network of cross-linked polymer chains further contains from 0.1% to 40% by weight of a lithium ion-conducting additive dispersed therein; and
wherein said lithium ion-conducting additive contains a lithium salt selected from lithium perchlorate (LiClO$_4$), litlithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphate (LiPF$_3$(CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

7. The lithium metal secondary battery of claim 1, wherein said lithium ion-conducting additive is selected from Li$_2$CO$_3$, Li$_2$O, Li$_2$C$_2$O$_4$, LiOH, LiX, ROCO$_2$Li, HCOLi, ROLi, (ROCO$_2$Li)$_2$, (CH$_2$OCO$_2$Li)$_2$, Li$_2$S, Li$_x$SO$_y$, or a combination thereof, wherein X=F, Cl, I, or Br, R=a hydrocarbon group, 0<x≤1, 1≤y≤4.

8. The lithium metal secondary battery of claim 1, wherein said cathode active material is selected from an inorganic material, an organic material, a polymeric material, sulfur, an alkali metal polysulfide, selenium, an alkali metal polyselenide, a Se/S alloy or mixture, or a combination thereof.

9. The lithium metal secondary battery of claim 2, wherein said cathode active material is selected from an inorganic material, an organic material, a polymeric material, sulfur, an alkali metal polysulfide, selenium, an alkali metal polyselenide, a Se/S alloy or mixture, or a combination thereof.

10. The lithium metal secondary battery of claim 8, wherein said inorganic material is selected from a metal oxide, metal phosphate, metal silicide, metal selenide, transition metal sulfide, or a combination thereof.

11. The lithium metal secondary battery of claim 9, wherein said inorganic material is selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

12. The lithium metal secondary battery of claim 8, wherein said inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof.

13. The lithium metal secondary battery of claim 9, wherein said inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and x+y≤1.

14. The lithium metal secondary battery of claim 8, wherein said inorganic material is selected from a transition metal dichalcogenide, a transition metal trichalcogenide, or a combination thereof.

15. The lithium metal secondary battery of claim 8, wherein said inorganic material is selected from $TiS_2$, $TaS_2$, $MoS_2$, $NbSe_3$, $MnO_2$, $CoO_2$, an iron oxide, a vanadium oxide, or a combination thereof.

16. The lithium metal secondary battery of claim 10, wherein said metal oxide contains a vanadium oxide selected from the group consisting of $V_{O2}$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein 0.1<x<5.

17. The lithium metal secondary battery of claim 10, wherein said metal oxide or metal phosphate is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

18. The lithium metal secondary battery of claim 8, wherein said inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

19. The lithium metal secondary battery of claim 8, wherein said organic material or polymeric material is selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8— naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

20. The lithium metal secondary battery of claim 19, wherein said thioether polymer is selected from Poly[methanetetryl-tetra(thiomethylene)](PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

21. The lithium metal secondary battery of claim 8, wherein said organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

22. The lithium metal secondary battery of claim 1, wherein said cathode active material comprises a sulfur-containing material selected from a sulfur-carbon hybrid, sulfur-graphite hybrid, sulfur-graphene hybrid, conducting polymer-sulfur hybrid, metal sulfide, sulfur compound, selenium-carbon hybrid, selenium-graphite hybrid, selenium-graphene hybrid, conducting polymer-selenium hybrid, metal selenide, selenium compound, or a combination thereof.

23. The lithium metal secondary battery of claim 22, wherein said metal sulfide contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

24. The lithium metal secondary battery of claim 23, wherein said metal element M is selected from Li, Na, K, Mg, Zn, Cu, Ti, Ni, Co, Fe, or Al.

25. The lithium metal secondary battery of claim 22, wherein said metal sulfide contains $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, and a combination thereof.

26. The lithium metal secondary battery of claim 1, wherein said lithium metal secondary battery comprises a rechargeable lithium metal cell, a lithium-sulfur cell, a lithium-selenium cell, a lithium-sulfur/selenium cell, or lithium-air or lithium-oxygen cell.

27. The lithium metal secondary battery of claim 1, wherein said anode active material layer is supported by an anode current collector.

28. The lithium metal secondary battery of claim 6, wherein said anode active material layer is supported by an anode current collector.

* * * * *